United States Patent
Pagan

(10) Patent No.: US 7,761,581 B2
(45) Date of Patent: Jul. 20, 2010

(54) METHOD AND SYSTEM FOR COOKIE EXPIRATION BASED ON USER IDLE AND PRESENCE DETECTION

(75) Inventor: William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 11/954,196

(22) Filed: Dec. 11, 2007

(65) Prior Publication Data
US 2009/0150551 A1    Jun. 11, 2009

(51) Int. Cl.
G06F 15/16    (2006.01)
(52) U.S. Cl. .................. 709/228; 709/227; 709/229
(58) Field of Classification Search .......... 709/227–229
See application file for complete search history.

(56) References Cited

U.S. PATENT DOCUMENTS

| | | | |
|---|---|---|---|
| 7,024,394 | B1 | 4/2006 | Ashour et al. |
| 7,546,370 | B1 * | 6/2009 | Acharya et al. ............. 709/227 |
| 2003/0208594 | A1 * | 11/2003 | Muret et al. ................. 709/224 |
| 2004/0054791 | A1 * | 3/2004 | Chakraborty et al. ....... 709/229 |
| 2004/0073660 | A1 * | 4/2004 | Toomey ....................... 709/224 |
| 2004/0158574 | A1 | 8/2004 | Tom et al. |
| 2005/0021775 | A1 * | 1/2005 | Fujinaga ..................... 709/228 |
| 2006/0026286 | A1 | 2/2006 | Lei et al. |
| 2006/0075110 | A1 | 4/2006 | Seraphin |
| 2006/0075122 | A1 * | 4/2006 | Lindskog et al. ............ 709/228 |

OTHER PUBLICATIONS

Lotus Labs Exposed, [online]; [retrieved on Jun. 22, 2007]; retrieved from the Internet http://www-10.lotus.com/ldd/labscontent.nsf/DisplayForm/SAABDOE38746094156DC600568683C1.
Remembering Users with Cookies and Sessions, Learning PHP 5, David Sklar, Chapter 8, pp. 151-169 , 2004.
Secure Logoff From Published Web Sites, [online]; [retrieved on Jun. 22, 2007]; retrieved from the Internet http://www.microsoft.com/technet/isa/2006/logoff.mspx.
Etsaws::Authcookiehandler, [online]; [retrieved on Jul. 23, 2007]; retrieved from the Internet http://lsg.media.berkeley.edu/EtsAws/EtsAws-AuthCookieHandler.html.

* cited by examiner

Primary Examiner—Yves Dalencourt
Assistant Examiner—Michael C Lai
(74) Attorney, Agent, or Firm—Cantor Colburn LLP; Cynthia Seal

(57) ABSTRACT

Detecting Internet web navigation and web browsing idle conditions using cookies during navigating and browsing sessions, is accomplished by receiving in a local computer, from a server, a cookie that has a policy that causes the cookie to have either an active or an expired status, based on the presence of web content provided by the server or detection that either the user is idle or the user is away from the computer. A signal from the user of the computer activates the policy in the cookie, causing the cookie to have a status of either active or expired. When a signal is received from the server requesting the status of the cookie, the computer determines whether the status of the cookie is active or expired. When the status is active, the server continues to provide content to the computer and when the status is expired, the server stops sending content.

2 Claims, 2 Drawing Sheets

METHOD AND SYSTEM FOR COOKIE EXPIRATION BASED ON USER IDLE AND PRESENCE DETECTION

TECHNICAL FIELD

The present invention relates to Internet based data processing. More particularly, the present invention relates to efficiently facilitating web page navigating and browsing by establishing cookie expiration parameters.

BACKGROUND

Known methods and systems for web browsing idle detection using
cookies are applied in sensitive online member web site navigation and web browsing sessions to ensure that a user's browsing sessions only stay active as long as the user is not idle. These known methods and systems work by resetting cookie expiration timers every time a user submits a server request or changes the current web page, or submits a form, or navigates somewhere else. In such known methods and systems, the setting of the length of lime until the timer expires is arbitrarily determined and sometimes the timer expires while the user is actively on the page being displayed. Thus, the timer may expire while the user may be reading lengthy web page information. Such short timer lengths set on cookies will cause the user to have to re-login continually, and provide a bad browsing experience for the user. In the alternative, a cookie timer expiration length of time set too long will compromise security during the user session.

SUMMARY OF THE INVENTION

A method and system are disclosed herein for using a cookie containing a policy of efficiently detecting idle conditions associated with Internet web navigation and web browsing sessions by a user, using a local computer. The detection of web navigating and web browsing idle conditions is accomplished by receiving in a local client computer, from a web server, a cookie that has a policy that causes the cookie to have either an active status, based on the presence of content provided by the web server or have an expired status, based on the local computer detecting that either one or more of the screen saver is activated, the session is locked, the instant messenger goes to away status, the browser window is inactive for a threshold period of time or the user is idle, because the local computer no longer detects user input signals from user input devices such as a mouse, keyboard, touch screen, a light pen or voice activation commands from a voice activation system. Further, within the method and system, the local computer determines that the user is away from the local computer by no longer receiving user input signals from user input devices such as a biometric detection system including one of or a combination of a thermal detector, or an optical detector or an iris detector or an electro-mechanical pressure detector. In exemplary embodiment, the user can end the navigating and/or browsing session by activating the input device, such as a keyboard, or mouse or touch screen to generate a command to close or end the session. Also, the absence of receiving a signal from biometric and/or electromechanical sensors can cause the local computer to close or end the web browsing and/or web navigating session. The cookie containing the policy is stored on the local client computer. A signal from the user input device or system on the local client computer activates the policy in the cookie; thus, causing the cookie to have a status of either active or expired. When a signal is received by the local computer from the server or generated by the local computer requesting the status of the cookie, the local computer determines whether the status of the cookie is active or expired. When it is determined by the local computer that the status of the cookie is active, the web server continues to provide content to the local computer and when it is determined that the status of the cookie is expired, then the server stops sending content to the local computer.

The above-described and other features will be appreciated and understood by those skilled in the art from the following detailed description, drawings, and appended claims.

DETAILED DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings, which are meant to be exemplary, and not limiting, wherein:

DETAILED DESCRIPTION

The exemplary embodiment of the invention is described below in detail. The disclosed exemplary embodiment is intended to be illustrative only, since numerous modifications and variations therein will be apparent to those of ordinary skill in the art. In reference to the drawings, like numbers will indicate like parts continuously throughout the view. Further, the terms "a", "an", "first", "second" and "third" herein do not denote a limitation of quantity, but rather denote the presence of one or more of the referenced item.

Figure 1:
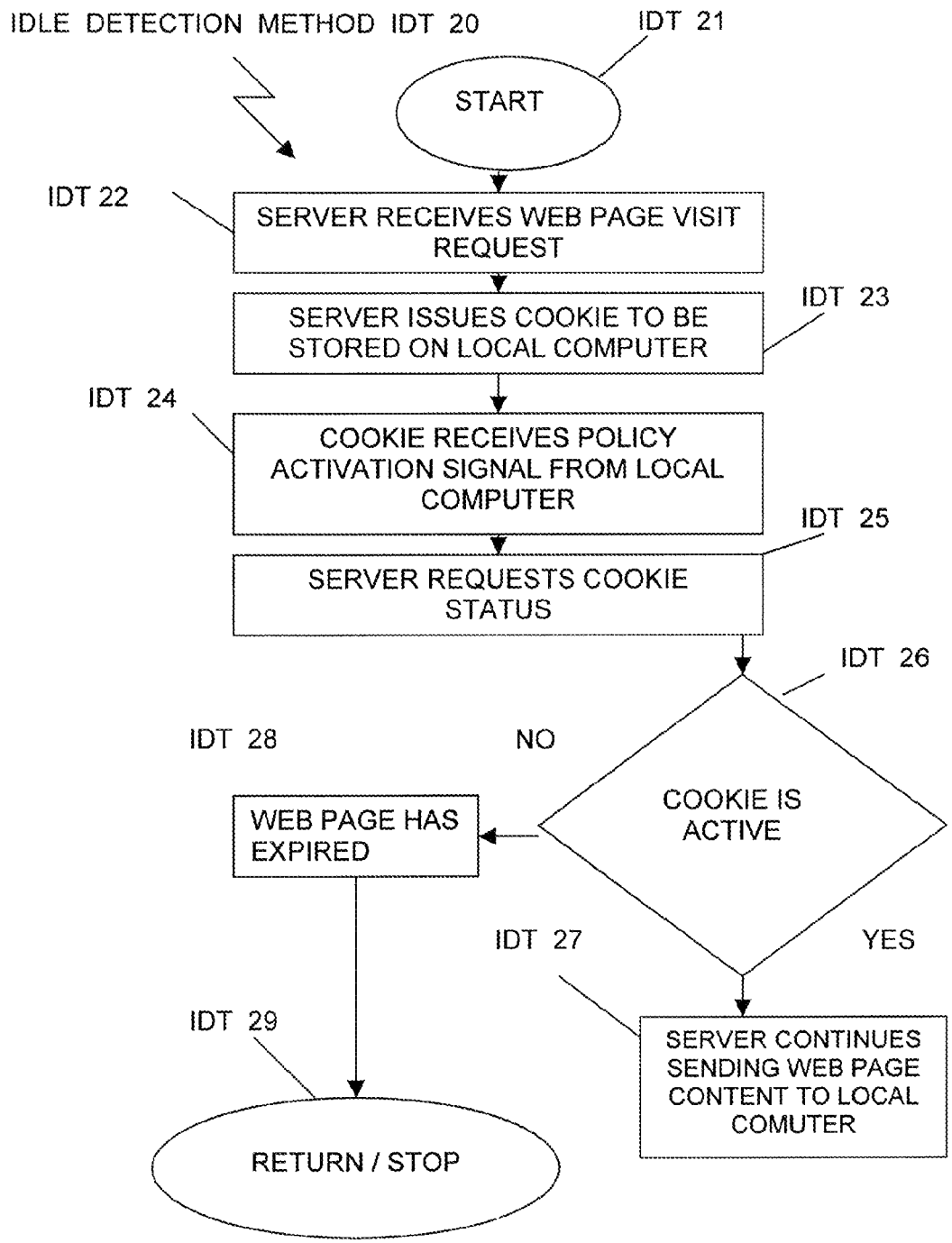
FIG. 1 illustrates a method of carrying out an exemplary embodiment of efficiently detecting idle conditions in web navigating and web browsing sessions.
Figure 2:
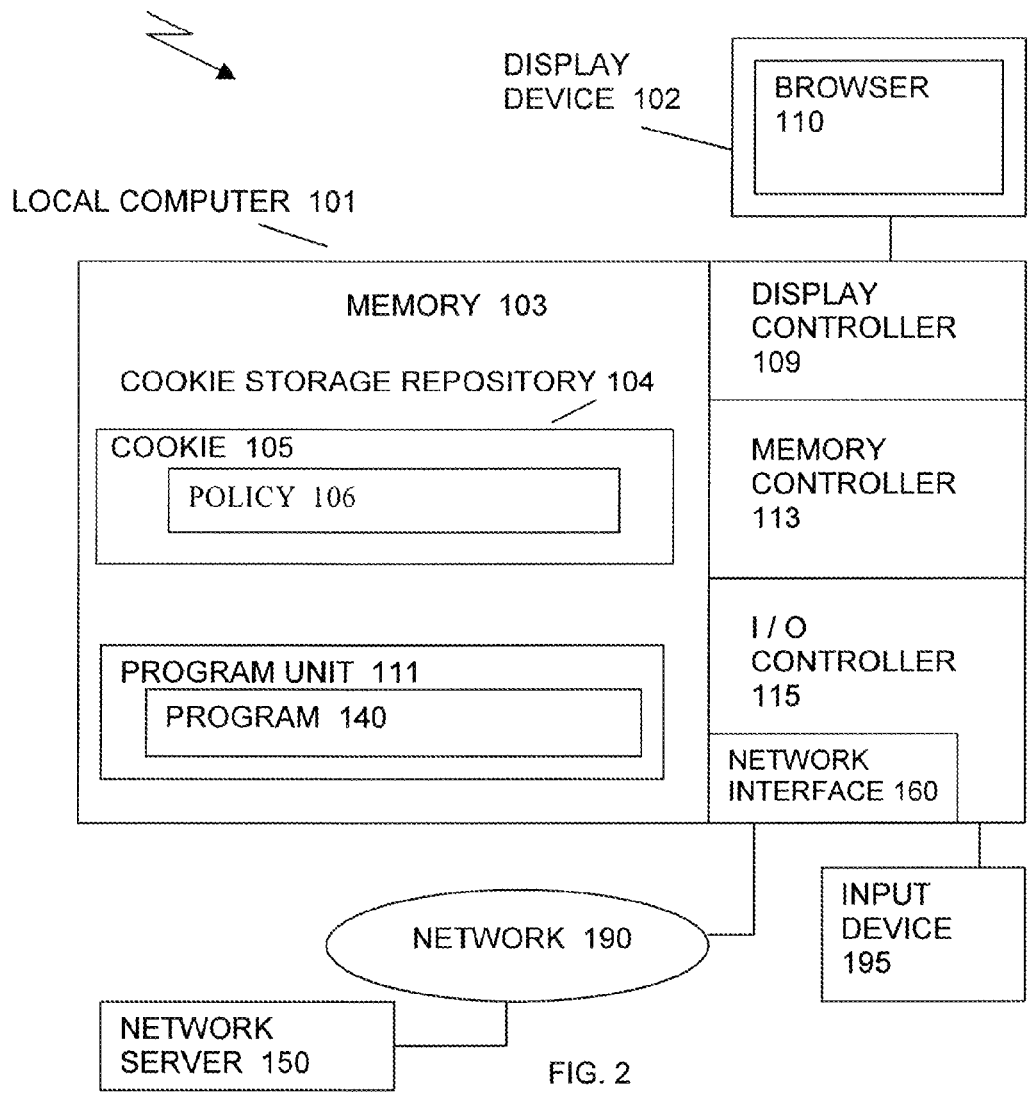
FIG. 2 illustrates the system implementation of the exemplary embodiment of efficiently detecting idle conditions in web navigating and web browsing sessions.

The exemplary embodiment will be understood by referring to FIGS. 1 and 2. A process of web navigation and web browsing idle detection method IDT 20 is illustrated in FIG. 1. Further, the idle detection method IDT 20 is implemented in the efficient idle detection system 100, illustrated in FIG. 2.

Referring to FIG. 2, the efficient idle detection system 100 (hereafter system 100) includes local computer 101 connected to network server 150, which is a web server, over network 190. Network 190 can be a wired and/or wireless local area network or a wide area network, including an extranet or the Internet. Local computer 101 includes at least an input device 195 a display device 102, a network interface 160 and an assortment of internal and external controllers and/or peripheral devices including display controller 109, memory controller 113 and input/output (I/O) controller 115. The network interface 160 can be, for example but not limited to, one or more buses or other wired or wireless connections, as is known in the art. The network interface 160 may have additional elements, which are omitted for simplicity, such as controllers, buffers (caches), drivers, repeaters, and receivers, to enable communications. Further, the network interface 160 may include address, control, and/or data connections to enable appropriate communications among the aforementioned components.

Input device 195 can include a mouse, a keyboard, a touch screen, a light pen, a biometric detection system including one or more of a thermal detector including an infrared detector, an optical detector, an iris detector, an audio sensor including a voice activation system, a microphone and en electro-mechanical sensor including a pressure sensor. Local computer 101 also includes memory 103. Residing in memory 103 is program unit 111, which contains program 140. Program 140 can include any computer executable program code or algorithm or application software that can be stored on a computer executable medium, including memory 103 and can be compiled and run on a general purpose computer processor, or stand along computing system such as local computer 101, so as to cause local computer 101 to perform certain operations. Also, residing in memory 103 is cookie storage repository 104 which can store a plurality of cookies, as represented by cookie 105 illustrated in FIG. 2. Cookie 105 can contain a plurality of policies as represented by policy 106, also illustrated in FIG. 2.

The memory 103 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge or cassette). Moreover, the memory 103 may incorporate electronic, magnetic, optical, and/or other types of storage media. Note that the memory 103 can have a distributed architecture, where various components are situated remotely from one another, but can be accessed by the local computer 101.

Referring to FIGS. 1 and 2, the exemplary embodiment of idle detection method IDT 20 illustrated in FIG. 1 will be described as implemented in system 100, which is illustrated in FIG. 2. At operation start IDT 21, computer executable code in program 140 when executed by local computer 101, causes local computer 101 to perform the operation start IDT 21, to initiate the local computer 101 to perform Internet web navigation and web brow-sing idle detection operations using cookies during navigating and browsing sessions by a user using a web browser 110.

At operation IDT 22, program 140, when executed by local computer 101, causes local computer 101 to transmit, by the local computer 101 via input device 195, a request to a web server, in this case network server 150, to visit a web page of a web site on network server 150. When network server 150 receives the request to visit the web site, network server 150 causes web browser 110 to be displayed on the display device 102 and network server 1 50 issues at least one cookie 105 of a plurality of cookies to the local computer 101.

At operation IDT 23, program 140, when executed by local computer 101, causes local computer 101 to receive the at least one cookie 105 issued by network server 150. Cookie 105 is subsequently stored in cookie storage repository 104 residing in memory 103. Cookie storage repository 104 has the capacity to hold a plurality of cookies. Cookie 105 contains at least one policy 106 from a plurality of policies that cause the cookie 105 to have either an active status, based on the local computer 101 receiving and/or continuing to receive web content from network server 190, or cookie 105 has an expired status, where an expired status means that the network server 150 is no longer sending web content to the local computer 101, because program 140 causes web browser 110 to detect that either the user is idle and not actively navigating and/or browsing on the browser 110, or the user is away from the local computer 101.

In the exemplary embodiment, the at least one policy 106 is an at least one enhanced idle detection policy of a plurality of enhanced idle detection policies and the cookie 105 contains a date of issue and a date of expiration and a keyword flag indicating a type of enhanced idle detection policy, where the type of enhanced idle detection policy includes all cookies with expiration requirements set below a preset threshold established by the at least one enhanced policy, if configured to do so by the user, even when not requested by the website, such that the website can be assumed to be short-sessioned based; thus, benefiting from the use of this expiration policy below some threshold, even if not specifically designed to leverage idle detection enhancements from such a policy.

The type of the at least one enhanced policy further includes either being configured by the user of the local computer, because the user wants to use the type of idle detection policy most preferable to the user or being configured by a program code embedded in the cookie 105. The program code embedded in the cookie 105 can be one or more of but not limited to JavaScript and XML. Further, the at least one enhanced idle detection policy includes but is not limited to detecting that the user is idle because the screen saver is activated, the browsing session is locked, the navigating session is locked, the instant messenger goes to away status, the browser window is inactive for a threshold period of time and/or the user has left the terminal.

In the exemplary embodiment, the web browser detects the user has left the terminal by receiving a first signal from a user input device including but not limited to a mouse, a keyboard, a touch screen, a light pen, a biometric detection system, where the biometric detection system includes a thermal detector including an infrared detector, an optical detector, an iris detector, an audio sensor including a voice activation system, and/or an electro-mechanical sensor including a pressure sensor. In the exemplary embodiment, software in the web browser 110 will enforce the enhanced idle detection request, as requested by either the policy 106 embedded in cookie 105 and/or the web browser 110 will enforce the enhanced idle detection request as requested by the user, as part of the browser 110 configuration. In an alternative embodiment, cookie 105 can contain JavaScript or some other code that can be run, which will cause the cookie 105 to be maintained in an active status or to be expired, instead of leaving the decision of determining the status of the cookie 105 up to the browser 110. This approach may include security considerations.

At operation IDT 24, program 140 causes local computer 101 to transmit a second signal, which is an activation signal initiated by a user manipulating input device 195 and further causes activation of the at least one type of enhanced idle detection policy of policy 106 in the cookie 105, which causes the cookie 105 to have either the active status or the expired status.

At operation IDT 25, program 140 causes local computer 101 to receive from the network server 150 a third signal requesting confirmation of either the active status or the expired status of the cookie 105, so that the a determination can be made by the network server 150 and/or the browser 110 whether or not to continue sending web content to the local computer 101.

At operation IDT 26, program 140 causes local computer 101 to determine whether the status of cookie 105 is either active or expired and to transmit to the network server 150 a fourth signal indicating the active status and/or the expired status of cookie 105, where upon receiving, by the network server 150, the fourth signal indicating the active status and/or the expired status of the cookie 105, the network server 150 sends a fifth signal to the local computer 101 indicating to the local computer 101 that the network server has determined to either continue providing web page content to the local computer 101, as illustrated at operation IDT 27 of FIG. 2, when the status of the cookie 105 is active or to stop providing web page content to the local computer 101, as illustrated at operation IDT 28 of FIG. 2, when the status of the cookie 105 is expired, where the fourth signal transmitted from the local computer to the network server indicates either the active status or the expired status of the cookie, which is used by the network server determine whether to continue providing web page content or to stop providing web page content, and is derived from the first signal from the user input device indicating that the user is idle, because the local computer detected that one or more of the screen saver is activated on the browser, the browsing session is locked, the navigating session is locked, the instant messenger goes to away status, the browser window is inactive for a threshold period of time and the user has left the terminal. In the exemplary embodiment, the web browser detects the user has left the terminal by receiving a signal from a user input device including one or more of a mouse, a keyboard, a touch screen, a light pen, a biometric detection system including one or more of a thermal detector including an infrared detector, an optical detector, an iris detector, an audio sensor including a voice activation system, and en electro-mechanical sensor including a pressure sensor.

At any stage of the method IDT 20, the method can be directed to operation return/stop IDT 29 by program 140, where the status of cookie 105 can be updated or the type of enhanced idle detection policy can be updated by return operation or the method IDT 20 can be directed to stop.

Thus, the useful, practical and concrete result of web browser idle detection is accomplished because by inventive design cookie 105 contains flexibility in implementing enhanced idle detection policies as discussed in regard to policy 106.

The disclosure has been described with reference to the exemplary embodiment, where for example, a cookie 105 contains embedded idle detection policies.

The capabilities of the present invention can be implemented in software, firmware, hardware or some combination thereof.

The local computer 101 is a hardware device for executing software, particularly that stored in memory 103. The local computer 101 can contain any custom made or commercially available processor, a central processing unit (CPU), an auxiliary processor among several processors associated with the local computer 101, a semiconductor based microprocessor (in the form of a microchip or chip set), a macroprocessor, or generally any device for executing software instructions.

The program 140 in memory 103 may include one or more separate programs, each of which comprises an ordered listing of executable instructions for implementing logical functions. In the example of FIG. 2, the program 140 in the memory 103 includes the method IDT 20 in accordance with the present invention and a suitable operating system (O/S), including Windows based operating systems.

Additionally, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

In the context of this document, a "computer-executable and/or readable medium" can be any medium that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium, upon which the program is printed, as the program can be electronically captured, via for instance optical scanning of paper or other medium, then compiled, interpreted or otherwise processed in a suitable manner if necessary, and then stored in a computer memory.

The flow diagrams depicted herein are just examples. There may be many variations to these diagrams or the steps (or operations) described therein without departing from the spirit of the invention. In the exemplary embodiment, the operations may be performed in a differing order, or operations may be added, deleted or modified. All of these variations are considered a part of the claimed invention.

In addition, many modifications may be made to adapt a particular situation or material to the teachings of the disclosure without departing from the essential scope thereof. For example, the method of determining active and expired status can be carried out by at least polling and/or interrupt operations. It will be understood by those skilled in the art that various changes may be made and equivalents may be substituted for elements thereof without departing from the scope of the disclosure. Therefore, it is intended that the disclosure not be limited to any one particular embodiment disclosed as the best mode contemplated for carrying out this disclosure, but that the disclosure will include all embodiments falling within the scope of the appended claims.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

In addition, many modifications may be made to adapt a particular situation or material to the teachings of the disclosure without departing from the essential scope thereof. It will be understood by those skilled in the art that various equivalents may be substituted for elements thereof without departing from the scope of the disclosure. Therefore, it is intended that the disclosure not be limited to any one particular embodiment disclosed as the best mode contemplated for carrying out this disclosure, but that the disclosure will include all embodiments falling within the scope of the appended claims.

What is claimed is:

1. A method, implemented in a computer system, of Internet web navigation and web browsing idle detection using cookies during a navigating session and a browsing session by a user using a web browser, wherein the computer system contains a local computer including a non-transitory computer readable storage medium containing computer executable code that when executed by the local computer causes the local computer to perform the method comprising:

transmitting by the local computer a request to a web server to visit a web page of a web site;

receiving by the local computer, from the web server, a cookie that contains at least one policy from a plurality of policies that cause the cookie to have either an active status or an expired status;

wherein the active status is based on receiving content from the web server and the expired status is when a web browser detects either the user is idle or the user is away from the local computer, wherein the at least one policy is an at least one enhanced idle detection policy, wherein the cookie contains a date of issue, a date of expiration and a keyword flag indicating a type of the at least one enhanced idle detection policy, wherein the type of the at least one enhanced idle detection policy includes all cookies with expiration requirements set below a preset threshold established by the at least one enhanced idle detection policy, wherein the type of the at least one enhanced idle detection policy further includes one of being configured by the user of the local computer and being configured by a program code embedded in the cookie, wherein the program code includes one of JAVASCRIPT and XML, wherein the at least one enhanced idle detection policy includes detecting that the user is idle because a screen saver is activated, a browsing session is locked, a navigating session is locked, an instant messenger goes to away status, a browser window is inactive for a threshold period of time or the user has left a terminal, and wherein the web browser detects the user is idle by receiving, by the local computer, a first signal from a user input device including one of mouse, a keyboard, a touch screen, a light pen, and a biometric detection system, and wherein the biometric detection system includes a thermal detector including one of an infrared detector, an optical detector, an iris detector, an audio sensor including a voice activation system, and an electro-mechanical sensor including a pressure sensor;

storing on the local computer, the cookie received from the web server;

transmitting to the cookie, from the local computer, a second signal generated by the user input device activating the at least one enhanced idle detection policy in the cookie which causes the cookie to have either the active status or the expired status;

receiving by the local computer, from the web server a third signal requesting either the active status or the expired status of the cookie; and determining by the local computer either the active status or the expired status of the cookie;

transmitting from the local computer to the web server a fourth signal indicating either the active status or the expired status of the cookie; and after transmitting to the web server the fourth signal indicating either the active status or the expired status of the cookie, receiving, in the local computer, a fifth signal from the web server indicating that the web server has determined to continue providing web page content to the local computer when the status of the cookie is active, or to stop providing web page content to the local computer when the status of the cookie is expired.

2. The method of claim 1, wherein the fourth signal transmitted from the local computer to the web server indicating either the active status or the expired status of the cookie, used by the web server in determining to continue providing web page content or to stop providing web page content, is derived from the first signal from the user input device indicating that the user is idle, because the local computer detected that one or more of the screen saver is activated on the web browser, the browsing session is locked, the navigating session is locked, the instant messenger goes to away status, the browser window is inactive for a threshold period of time and the user has left the terminal, wherein the web browser detects the user has left the terminal by receiving a signal from the user input device including one of the mouse, the keyboard, the touch screen, the light pen, the biometric detection system including one or more of the thermal detector including the infrared detector, the optical detector, the iris detector, the audio sensor including the voice activation system, and the electro-mechanical sensor including the pressure sensor.

* * * * *